United States Patent [19]

Howkins

[11] Patent Number: 4,459,601

[45] Date of Patent: Jul. 10, 1984

[54] INK JET METHOD AND APPARATUS

[75] Inventor: Stuart D. Howkins, Ridgefield, Conn.

[73] Assignee: Exxon Research and Engineering Co., Florham Park, N.J.

[21] Appl. No.: 336,603

[22] Filed: Jan. 4, 1982

Related U.S. Application Data

[63] Continuation-in-part of Ser. No. 229,994, Jan. 30, 1981, abandoned.

[51] Int. Cl.³ .............. G01D 15/18

[52] U.S. Cl. .............. 346/140 R

[58] Field of Search .............. 346/140 R

[56] References Cited

U.S. PATENT DOCUMENTS

| | | | |
|---|---|---|---|
| 3,287,579 | 11/1966 | Borner | 310/369 X |
| 3,452,360 | 6/1969 | Williamson | 346/140 R |
| 3,683,212 | 8/1972 | Zoltan | 346/140 X |
| 3,747,120 | 7/1973 | Stemme | 346/75 |
| 3,832,579 | 8/1974 | Arndt | 346/140 X |
| 3,946,398 | 3/1976 | Kyser | 346/1 |
| 4,034,380 | 7/1977 | Isayama | 346/140 |
| 4,068,144 | 1/1978 | Toye | 346/75 X |
| 4,072,959 | 2/1978 | Elmquist | 346/140 |
| 4,115,789 | 9/1978 | Fischbeck | 346/140 |
| 4,131,899 | 12/1978 | Christou | 346/140 |
| 4,189,734 | 2/1980 | Kyser et al. | 346/1.1 |
| 4,233,610 | 11/1980 | Fischbeck | 346/140 |
| 4,272,200 | 6/1981 | Hehl | 400/126 X |
| 4,367,478 | 1/1983 | Larsson | 346/140 |
| 4,383,264 | 5/1983 | Lewis | 346/140 |

OTHER PUBLICATIONS

Lee et al., High-Speed Droplet Generator, IBM TDB vol. 15, No. 3, Aug. 1972, p. 909.
Brownlow et al., Ink on Demand using Silicon Nozzles, IBM TDB, vol. 19, No. 6, Nov. 1976, pp. 2255–2256.
Durbeck et al., Drop on Demand Nozzle Arrays with High-Frequency Response; IBM TDB vol. 21, No. 3, Aug. 1978, pp. 1210–1211.

*Primary Examiner*—Joseph W. Hartary
*Attorney, Agent, or Firm*—Norman L. Norris

[57] ABSTRACT

An ink jet includes a variable volume chamber with an ink droplet ejecting orifice. The volume of the chamber is varied by a transducer which expands and contracts in a direction having at least a component extending parallel with the axis ink droplet ejection from the orifice. The transducer communicates with a moveable wall of the chamber which has a sufficiently small area such that the difference in the pressure pulse transit times from each point on the wall to the ink droplet ejection orifice is less than 1 microsecond.

69 Claims, 12 Drawing Figures

INK JET METHOD AND APPARATUS

RELATED APPLICATIONS

This application is a continuation-in-part of application Ser. No. 229,994, filed Jan. 30, 1981 now abandoned.

BACKGROUND OF THE INVENTION

This invention relates to ink jets, more particularly, to ink jets adapted to eject a droplet of ink from an orifice for purposes of marking on a copy medium.

It is generally desirable to employ an ink jet geometry which permits a plurality of ink jets to be utilized in a densely packed array so as to permit a reasonable area of a copy medium to be printed simultaneously as in the case of printing alphanumeric information. It is also desirable to utilize densely packed arrays of ink jets to achieve high quality in printing alphanumeric characters characterized by high speed or a high printing rate.

Difficulties can rise in achieving densely packed arrays because of the size or volume of the transducers which are utilized. For example, densely packed arrays can have a substantial mechanical cross-talk between channels. Moreover, large drive voltages may be necessary to appropriately energize transducers of the ink jets in the array and this can create undesirable electrical cross-talk particularly where the jets are densely packed.

Presently, considerable effort is being devoted to technology such as that disclosed in Stemme U.S. Pat. No. 3,747,120. While the Stemme patent does disclose a single jet as well as an array of jets, it is, in general, difficult to achieve densely packed arrays with this technology. Moreover, such arrays may employ a transducer configuration which results in a distributed pressure source applied to a volume of ink within an ink jet which may be undesirable, particularly in achieving stable satellite-free operation and high droplet velocity at low drive voltages.

Other difficulties which may be characteristic of this technology as well as other ink jet technology include: ink leaks which short out transducers, complex resonances in the transducer mounting structure which adversely affect jet operation, fabrication difficulties and unreliability in coupling energy from the transducer into the ink.

Another technology is disclosed in Elmquist U.S. Pat. No. 4,072,959 which does lend itself to a more densely packed array. As disclosed in this patent, a series of elongated transducers are energized by electrodes which apply a field transverse to the axis of elongation and the transducers are associated in a densely packed array of ink jet chambers. In this connection, it will be appreciated that the chambers are quite small so as to produce a high Helmholtz frequency as compared with the longitudinal resonant frequency of the individual transducers. Such a relationship can be undesirable since it is difficult to damp the longitudinal resonant frequency. Moreover, given the size of the Elmquist chambers, the proper control of the inlets to the chambers has no impact on improving the relationship between the Helmholtz frequency and the longitudinal resonant frequency of the transducer. As also disclosed in the Elmquist patent, each of the transducers is immersed in a common reservoir such that energization of one transducer associated with one chamber may produce cross-talk with respect to an adjacent chamber or chambers. In other words, there is no fluidic or mechanical isolation from chamber to chamber between the various transducers or more accurately, segments of a common transducer. In addition to the cross-talk problems, the construction as shown in the Elmquist patent poses a requirement for a non-conductive ink.

SUMMARY OF THE INVENTION

It is an object of this invention to provide an ink jet capable of being packed in dense arrays with a substantial number of jets.

It is a further object of this invention to provide an ink jet requiring the minimum amount of energy.

It is also an object of this invention to provide an ink jet wherein cross-talk between ink jets within an array may be minimized.

It is a further object of this invention to provide an ink jet where ink leaks will not adversely affect the transducer.

It is another object of this invention to avoid complex resonances in the transducer mounting structure which could adversely affect ink jet operation.

It is a further object of this invention to provide an ink jet which is easily fabricated.

It is also an object of this invention to reliably couple energy into ink within an ink jet.

It is a further object of this invention to achieve a high frequency of ink jet operation.

It is a still further object of this invention to permit a wide variety of inks to be utilized, e.g., inks with various conductive properties as well as viscosity and surface temperature.

It is a still further object of this invention to provide an ink jet capable of high frequency operation with ink of high viscosity.

It is a further object of this invention to provide an ink jet which is readily primed and not easily deprimed.

In accordance with these and other objects of the invention, an ink jet apparatus comprises a variable volume chamber having an ink droplet ejecting orifice. A transducer is adapted to expand and contract along an axis. Coupling means between the chamber and the transducer expand and contract the chamber in response to expansion and contraction along the axis of the transducer.

In accordance with one important aspect of the invention, an ink chamber has a Helmholtz or fluidic resonant frequency greater than the operating frequency of the ink jet but less than the transducer resonant frequency along the axis or in the direction of coupling. Preferably, the Helmholtz frequency is greater than 10 KHz with a Helmholtz frequency in excess of 25 KHz but less than 100 KHz preferred. Moreover, it is preferred that the longitudinal resonant frequency exceed the Helmholtz resonant frequency by at least 25% and preferably at least 50%. In order to achieve such a Helmholtz frequency, the cross-sectional dimension of the chamber transverse to the axis of droplet ejection is at least 10 times greater than the cross-sectional dimension of the orifice transverse to the axis of droplet ejection. Preferably, the cross-sectional dimension of the chamber exceeds 0.6 mm with a range of 0.6 mm to 1.3 mm preferred as compared with a cross-sectional dimension of the orifice in the range of 0.025 mm to 0.075 mm.

In accordance with another important aspect of the invention, the chamber includes restrictive inlet means which are appropriately sized and controlled so as to assure the foregoing Helmholtz frequency relationship. In this connection, restrictive inlet means maintain the cross-sectional area of ink flowing into the chambers substantially constant during expansion and contraction along the axis of the transducer. For priming considerations, the restricted inlet means is preferably located immediately adjacent the coupling means and the expanding and contracting of the chamber does not substantially affect the cross-sectional area of the ink flowing into the chamber.

In the preferred embodiment of the invention, the Helmholtz frequency is controlled by choosing an inlet restrictor dimension as compared with the orifice dimension such that the parallel inertance of the orifice and the inlet restrictor is in the range of $10^7$ to $10^9$ Pa sec.$^2$/m$^3$.

In accordance with another important aspect of the invention, the Helmholtz frequency is less than the organ pipe or acoustic resonant frequency. For this purpose, the overall length of the chamber is measured in a direction parallel with the axis of ink droplet ejection and does not greatly exceed the maximum cross-sectional dimension of the chamber. Preferably, the ratio does not exceed 5 to 1 with a ratio not greater than 2 to 1 preferred.

In accordance with another important aspect of the invention, the Helmholtz frequency is achieved by coupling the transducer into the chamber at a sufficently small area such that the difference in pressure pulse transit times from each point in the small area to the orifice is less then one microsecond where less than 0.1 microsecond is preferred and 0.05 microseconds represents an optimum. In terms of dimensions, the overall acoustic path link difference from each point in a small area to the orifice is less than 1.5 mm with less than 0.15 mm being preferred.

In accordance with still another important aspect of the invention, a plurality of jets are provided in an array wherein each transducer associated with the jet is substantially isolated from the ink and in substantially exclusive communication with a single chamber.

In accordance with another important aspect of the invention, means are provided for applying an electric field to the transducer such that transducer contracts along its axis so as to expand the chamber and expands along the axis so as to contract the chamber in the absence of an electric field applied to the transducer.

DETAILED DESCRIPTION OF A PREFERRED EMBODIMENT

Figure 1:
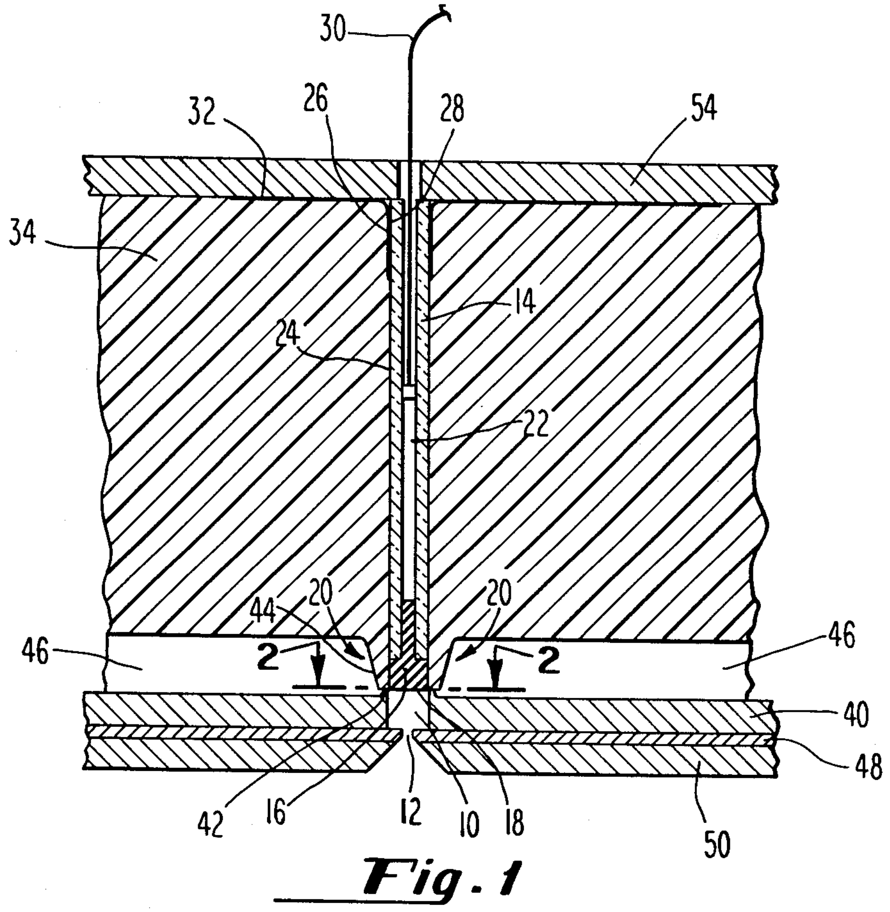
FIG. 1 is a sectional view of a jet apparatus presenting one embodiment of the invention.

Referring to FIG. 1, an ink jet apparatus of the demand or impulse type comprises a chamber 10 and an orifice 12 from which droplets of ink are ejected in response to the state of energization of a transducer 14 which communicates with the chamber 10 through a foot 16 forming a movable wall 18. Ink is supplied to the chamber 10 through a plurality of inlet ports 20 which are located adjacent the wall and at the rear extremity of the chamber 10 opposite from the forwardmost extremity at which the orifice 12 is located.

In accordance with this invention, the transducer 14 expands and contracts in a direction having at least a component extending parallel with the direction of droplet ejection through the orifice 12. In the embodiment of FIG. 1, a transducer expands and contracts in a direction which is substantially parallel with the axis of droplet ejection from the orifice 12. It will be noted that the axis of the transducer along which the transducer expands and contracts extends through the chamber 10 from a position further from the orifice 12 to a position closer to the orifice 12.

In accordance with another important aspect of the invention, the transducer 14 is elongated in the direction of expansion and contraction and the electric field resulting from the energizing voltage is applied transverse to the axis of elongation. This is particularly desirable since displacement can be made larger simply by increasing the length of the transducer 14, and an increase in length of the transducer 14 will not result in any decrease in density of an array formed from the ink jet shown in FIG. 1 as will be more fully explained herein. Moreover, large displacements can be achieved without applying large electrical voltages which could result in electrical cross-talk. However, it is desirable to limit the length of the transducer 14 so as to limit undesirable flexural motion which can result when the transducer becomes too long and thin and achieve the proper length mode resonance vis-a-vis the Helmholtz frequency as described hereinafter. It is also desirable to limit the length so as to minimize weight. In general, an overall length to width (i.e., outside diameter) ratio of 12 to 1 with a preferred ratio of 7 to 1 in a cylindrical transducer should be adequate for purposes of limiting this undesirable flexural motion and achieving the proper length mode resonance. The overall length to radial wall thickness of the cylindrical transducer should not exceed 60 to 1 with ratio 36 to 1 preferred.

In accordance with another important aspect of the invention, the transducer 14 is generally cylindrical in configuration. The cylinder is considered to be particularly desirable for minimizing the onset of flexing and other undesriable vibrational modes. The cylinder is also desirable in minimizing mechanical or acoustic cross talk between ink jets in an array.

In accordance with yet another important aspect of the invention, the transducer 14 is hollow along the axis thereof which coincides with the axis of expansion and contraction of the transducer 14. This allows a transducer drive signal voltage to be applied to the thickness of the transducer 14 between a first electrode 22 within the interior of a cylindrical opening 24 and a ground electrode 26 which extends along the exterior 28 of the transducer 14 so as to generate an electric field transverse to the axis. This configuration results in effective electrical shielding and hence minimizes electrical cross-talk. The polarity of the "hot" electrode (as contrasted with ground) is such that the applied electric field is in the same direction as the polarization of the transducer. This results in contraction on the transducer in response to the energization of the hot electrode and expansion in response to deenergization of the hot electrode. A lead 30 is connected to the electrode 22. A conductive surface 32 is connected to the electrode 26 and extends outwardly away from the transducer 14 at the rear of potting material 34, e.g., silicone rubber, which surrounds the transducer 14. Another laminated member 54 covers the conductive surface 32.

The use of the hollow cylindrical transducer 14 permits the drive signal voltage to be applied uniformly across a relatively thin portion of the transducer 14 so that relatively large displacements are obtained at low voltages. The uniformity of thickness of the thin portion of the transducer results in a substantial uniformity of the resultant electric field. Preferably, the thickness of the transducer lies in the range of 0.1 to 1 mm with 0.2 to 0.6 mm preferred so as to allow the application of transducer voltage levels of 25 volts to 200 volts. In particularly preferred embodiments, the thickness of the transducer 14 at the electrodes may be 0.10 to 0.50 mm with 0.20 to 0.30 mm preferred so as to permit the use of 25 to 80 volts.

In accordance with another important aspect of the invention, the foot 16 forming the movable wall 18 forms a plug which is inserted into the hollow end of the transducer 14. The area of the foot 16 at the wall 18 in contact with the chamber as shown substantially conforms with the cross-sectional area of the transducer 14 at the outside diameter thereof. Because of the relatively small area of the wall 18, the wall 18 acts as a point source of energy as compared with a distributed source which is of the utmost importance in establishing a stable, satellite-free, high velocity projection of droplets at low drive voltages. The overall area of the wall 18 is less than 50 $mm^2$ and preferably less than 2 $mm^2$. The area should be as small as possible in order to get the highest packing ability and hence the printing resolution from an array. In any event, the difference in pressure pulse transit time from each point on the wall 18 to the orifice 12 is less than 1 microsecond. Of course, the small areas can be accomplished because the necessary displacement can be achieved by the elongation of the transducer. It will be appreciated that the overall area of the foot 16 may be enlarged vis-a-vis the cross-sectional area of the transducer 14 to achieve the desired radiating surface of the movable wall in communication with ink within the chamber 10. In addition, the area of the wall 18 may be controlled to provide a type of impedance matching between the ink and the transducer 14.

It will also be understood that the foot 16 acts as a seal with respect to any ink which might otherwise lead back up into the interior of the hollow transducer 14 thereby avoiding an electrical short circuit. This in effect permits the transducer 14 to operate in direct communication with the ink within the chamber 10 without the use of any intermediate material between the transducer 14 and the ink which could adversely affect the operation of the jet or at the very least create a problem in reproducibility in large scale manufacture of ink jets where efforts might be made to reliably bond the intermediate material to the transducer.

Figure 3:
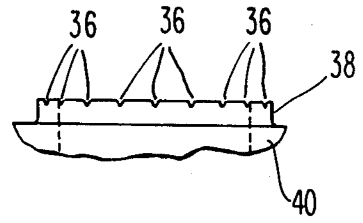
FIG. 3 is a fragmentary enlargement of the sectional view of FIG. 1.
Figure 2:
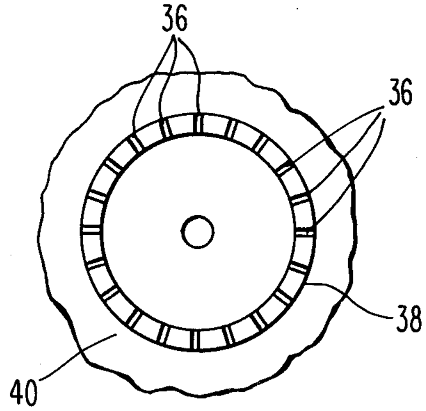
FIG. 2 is a sectional view taken along line 2—2 of FIG. 1.

As shown in FIGS. 2 and 3, a substantial number of inlet ports 20 are formed around the entire circumference of the chamber 10 by employing open channels 36 which extend through an annular land 38 in a laminated member 40 which forms a substantial portion of the chamber 10. The surface of the member 40 adjacent the open channels 36 is contacted by the surface 42 of a land 44 on the laminated member 34 so as to complete the formation of the inlet ports 20. It will be appreciated that the laminated members 34 and 40 greatly faciliate ease of fabrication or manufacture of the apparatus shown in FIGS. 1–3.

As shown in FIG. 1, an ink reservoir 46 which is maintained under ambient, i.e., unpressurized, communicates with inlet ports 20 of substantially constant cross-section. Any leakage between the reservoir 46 and the chamber 10 as well as any other leakage, e.g., around the foot 16, will not have any adverse consequences as long as the leakage is relatively small as compared with the inlet ports 20 since such leakage paths will be in parallel with the inlet ports 20. Accordingly, any concern for leakage which might normally arise out of a laminated construction as disclosed in FIG. 1 may be minimized. It will also be appreciated that locating the ports 20 at the rear of the chamber 10 greatly facilitates the construction of the jet in the manner herein described. Moreover, location of the ports 20 at the rear of the chamber reduces the possiblity that air bubbles will adversely affect the operation of the jet.

As also shown in FIG. 1, the laminated construction includes an orifice plate 48 which is covered by yet another laminated member 50 having a frustoconical opening 52 adjacent the orifice. A further laminated member 54 is secured to the end of the member 34 so as to extend along conductor surface 32.

A variety of materials may be utilized in fabricating the laminated construction shown in FIG. 1, which is greatly facilitated by the use of the cylindrical transducer 14. For example, the laminated members 40, 48, 50 and 54 may comprise stainless steel. Alternative materials include glass, a modified polyphenyline oxide manufactured by GE and known as Noryl and a glass filled di-allyl phthalate. The foot 16 may comprise a plastic or ceramic material which is bonded to the transducer 14 which may comprise piezoelectric material.

Figure 4:
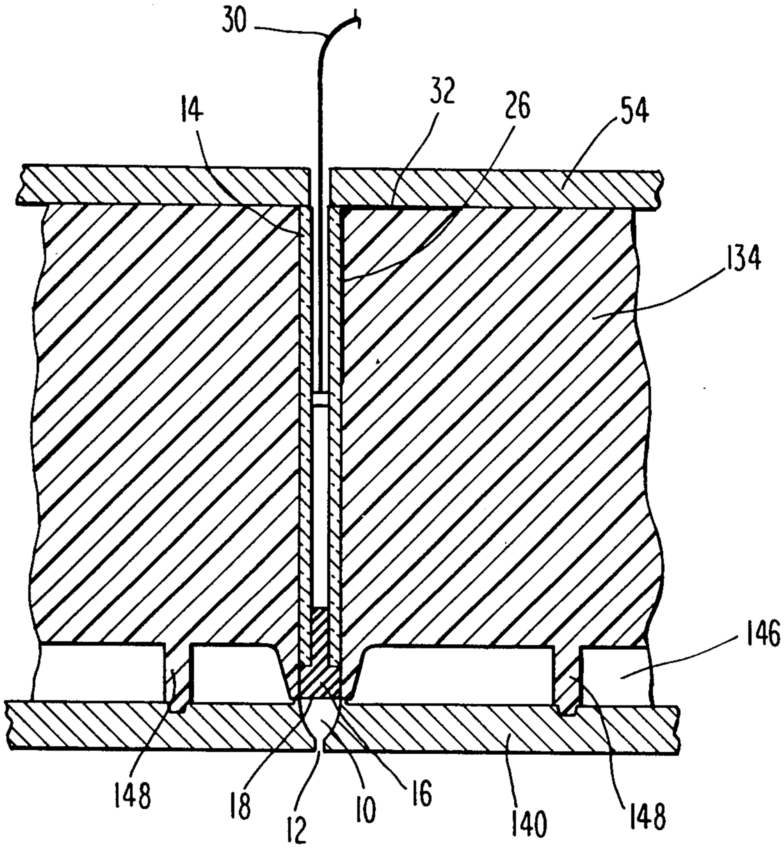
FIG. 4 is a sectional view of another embodiment of the invention.

Referring now to the embodiment of FIG. 4, an ink 3et apparatus is shown which is similar in many respects to the apparatus shown in FIGS. 1–3 including the transducer 14 and the wall 18 formed by the foot 16. However, the chamber 10 is formed by a single laminated member 140. The chamber 10 includes the orifice 12 into which the chamber 10 tapers. A laminated member 134 through which the transducer 14 passes forms an ink reservoir 146 in conjunction with the member 140. A projection 148 extends between the member 134 and the member 140 within the reservoir 146 and serves as a means of alignment and attachment between the member 134 and 140.

Figure 5:
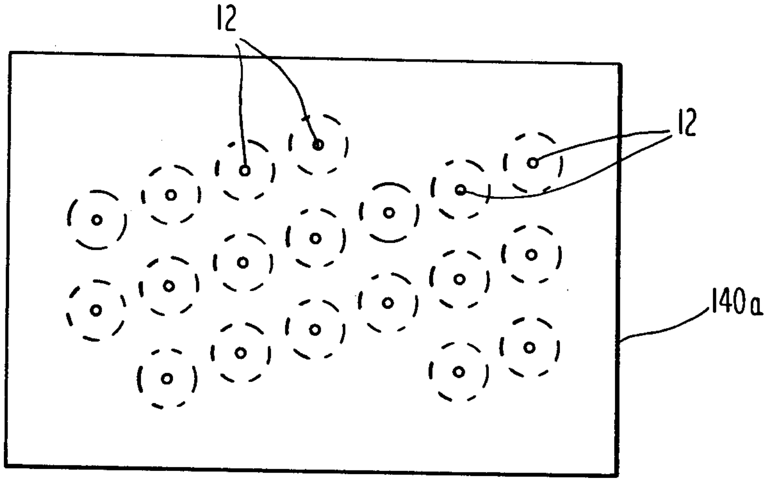
FIG. 5 is an orifice plate of an array of ink jets of the type shown in FIGS. 1–4.
Figure 6:
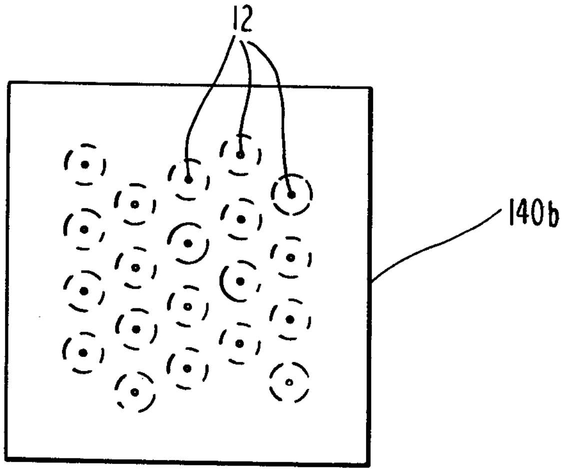
FIG. 6 is another orifice plate for an array of ink jets of the type shown in FIG. 1–4.

It will be readily appreciated that the use of elongated transducers which expand and contract along the axis of elongation permits fabrication of a rather dense array of ink jets. As shown in FIG. 5, the orifice plate 140*a* includes a plurality of orifices 12 where the dotted circles surrounding the orifices 12 indicate the diameter of the transducers 14 located behind the orifice plate 140*a*. FIG. 6 shows yet another array of orifices 12 in the orifice plate 140*b*. Although the nature of the staggering of the jets 112 differs in FIG. 6 and FIG. 5, in both instances the jets are densely packed which is extremely desirable in achieving a high quality alphanumeric printing with an ink jet array.

Figure 7:
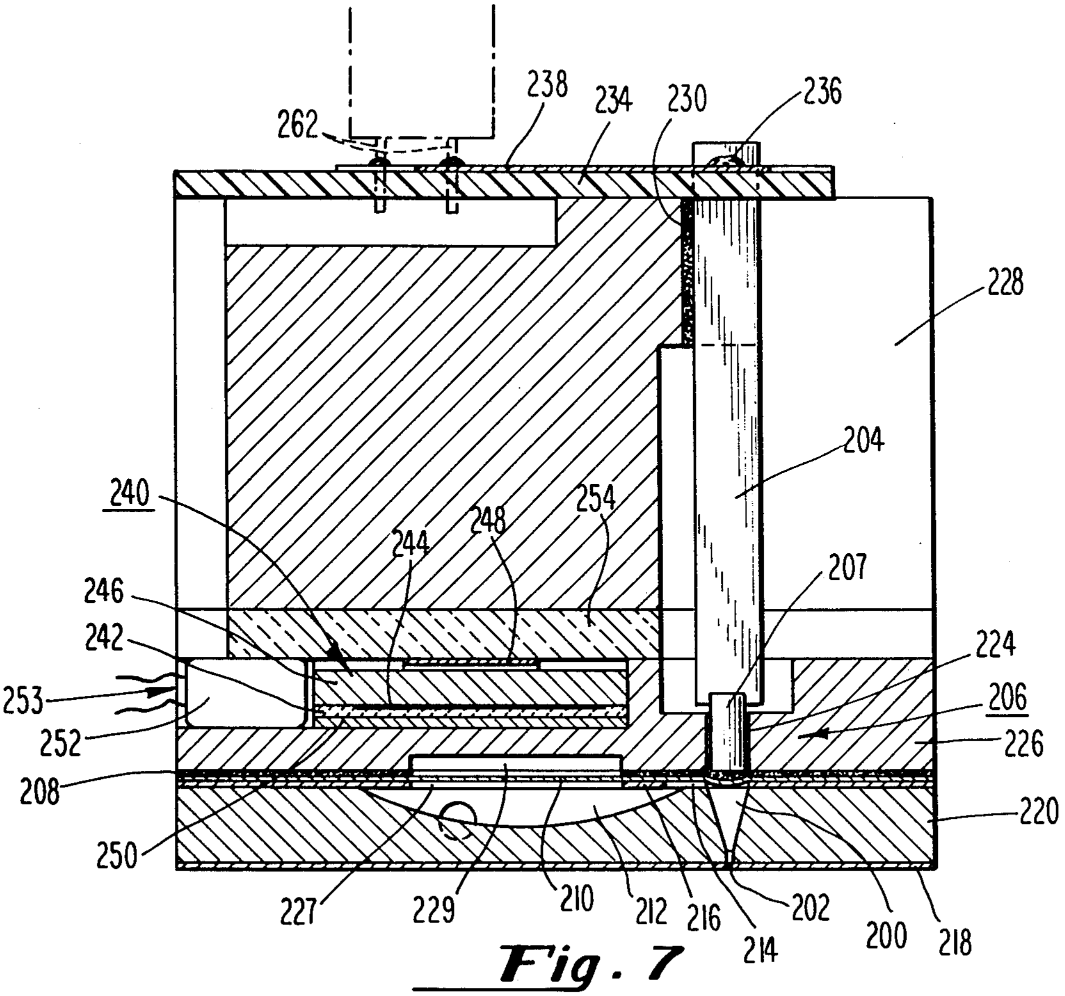
FIG. 7 is a sectional view of an ink jet apparatus representing another embodiment of the invention.
Figure 8:
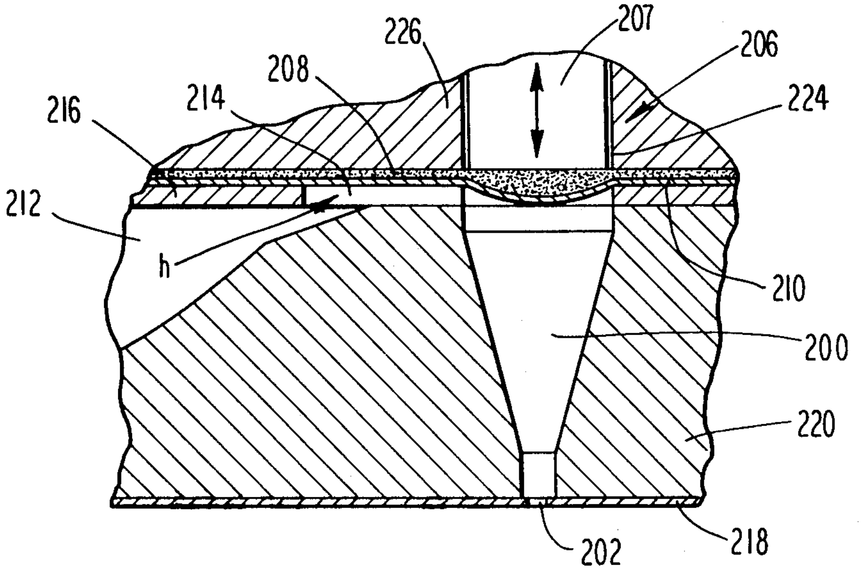
FIG. 8 is an enlarged view of a portion of the section shown in FIG. 7.
Figure 9:
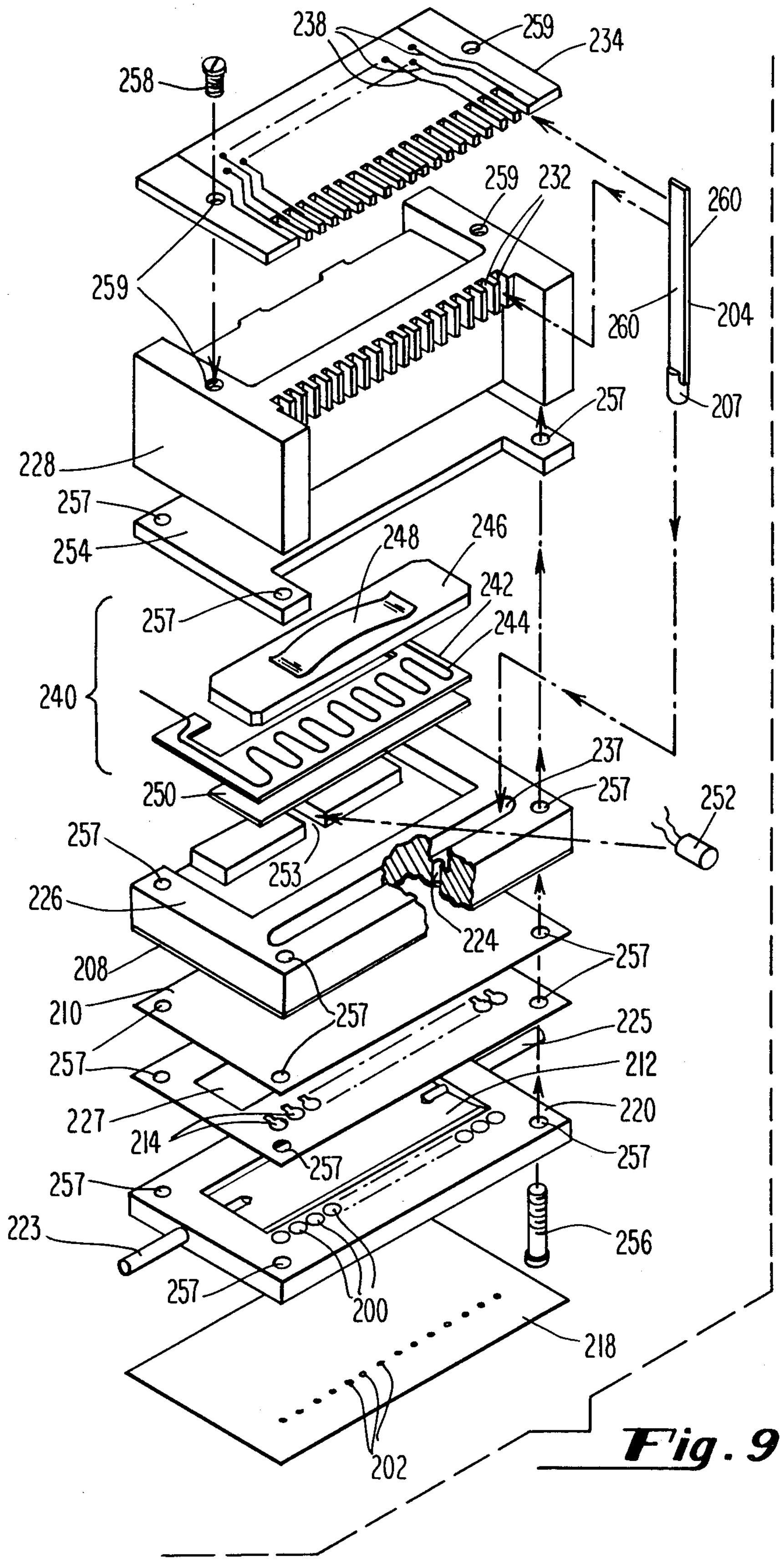
FIG. 9 is an exploded perspective view of the embodiment shown in FIGS. 7 and 8.

Referring now to the embodiment of FIGS. 7 through 9, a chamber 200 having an orifice 202 ejects droplets of ink in response to the state of energization of a transducer 204 for each jet in an array. The transducer 204 expands and contracts in directions indicated by the arrows shown in FIG. 8 along the axis of elongation and the movement is coupled to the chamber 200 by coupling means 206 which includes a foot 207, a visco-elastic material 208 juxtaposed to the transducer 207 and a diaphragm 210 which is preloaded to the position shown in FIGS. 7 and 8 in accordance with the invention of copending application Ser. No. 336,601, filed Jan. 4, 1982 which is assigned to the assignee of this invention and incorporated herein by reference.

Ink flows into the chamber 200 from an unpressurized reservoir 212 through restricted inlet means provided by a restricted opening 214. The inlet 214 comprises an opening in a restrictor plate 216 best shown in FIG. 9. In accordance with this invention, the cross-sectional area of ink flowing into the chamber through the inlet 214 is substantially constant during expansion and contraction of the transducer 204, notwithstanding the location of the inlet 214 immediately adjacent the coupling means 206 and the transducer 204. By providing the inlet 214 with an appropriate size vis-a-vis the orifice 202 in an orifice plate 218, the proper relationship between the inertance at the inlet 214 and the inertance at the orifice 202 may be maintained. This relationship which is also true of the embodiments shown in FIGS. 1 through 6 will be discussed in greater detail subsequently.

As shown in FIG. 8, the reservoir 212 which is formed in a chamber plate 220 includes a tapered edge 222 leading into the inlet 214 which is the invention of copending application Ser. No. 336,602, filed Jan. 4, 1982 assigned to the assignee of this invention and incorporated herein by reference. As shown in FIG. 9, the reservoir 212 is supplied with a feed tube 223 and a vent tube 225. In order to minimize mechanical cross-talk through the ink in the chamber, the reservoir is compliant as shown in FIG. 9 by virtue of the diaphragm 210 which is in communication with the ink through a large opening 227 in the restrictor plate 216 which is juxtaposed to an area of relief 229 in the plate 226 as shown in FIG. 7. In order to minimize fluidic cross-talk, each jet in the array of FIG. 9 is isolated from the ink and communication with a single chamber as also shown in FIGS. 1 through 6.

In accordance with the invention of copending application Ser. No. 336,600, filed Jan. 4, 1982 and Ser. No. 336,672, filed Jan. 4, 1982 assigned to the assignee of this invention and incorporated herein by reference, each of the transducers 204 as shown in FIGS. 7 and 9 are guided at the extremities thereof with intermediate portions of the transducer 204 being essentially unsupported as best shown in FIG. 7.

One extremity of the transducers 204 is guided by the cooperation of the foot 207 with a hole 224 in the plate 226. As shown in FIG. 7, the hole 224 in the plate 226 is slightly larger in diameter than the diameter of the foot 207. As a consequence, there need be very little contact between the foot 207 and the wall of the hole 224 with the bulk of contact which locates the foot 207 and thus supports the transducer 204 coming with the viscoelastic material 208 best shown in FIG. 8. The other extremity of the transducer 204 is compliantly mounted in a block 228 by means of a compliant or elastic material 230 such as silicone rubber in accordance with the invention of copending application Ser. No. 336,600, filed Jan. 4, 1982 assigned to the assignee of this invention and incorporated herein by reference. The compliant material 230 is located in slots 232 shown in FIG. 7 to provide support for the other extremity of the transducer 204. Electrical contact with the transducer 204 is also made in a compliant manner by means of a compliant printed circuit 234 which is electrically coupled by suitable means such as solder 236 to the transducer 204. As shown in FIG. 9, conductive patterns 238 are provided on the printed circuit 234.

As shown in some detail in FIGS. 7 and 9, the plate 226 including the hole 224 at the base of a slot 237 which receive the transducer 204 also includes a receptacle 239 for a heater sandwich 240 including a heater element 242 with coils 244, a hold down plate 246, a spring 248 associated with the plate 246 and a support plate 250 located immediately beneath the heater 240. In order to control the temperature of the heater 242, a thermistor 252 is provided which is received in a slot 253. The entire heater 240 is maintained within the receptacle in the plate 226 by a cover plate 254.

As shown in FIG. 9, the entire structure of the apparatus including the various plates are held together by means of bolts 256 which extend upwardly through openings 257 in the structure and bolts 258 which extend downwardly through openings 259 so as to hold the printed circuit board 234 in place on the plate 228. Not shown in FIG. 9 but depicted in dotted lines in FIG. 7 are connections 262 to the printed circuits 238 on the printed circuit board 234. It will also be appreciated that the viscoelastic layer 208 shown in FIGS. 7 and 8 is not shown in FIG. 9.

In accordance with one object of this invention, it is desirable to achieve a very high frequency of operation of the ink jet. It has been found that a desirably high frequency of operation may be achieved if the chamber of the ink jet is sufficiently small so as to have a high Helmholtz (i.e., liquid) resonant frequency as defined by the following equation:

$$f = \frac{1}{2\pi}\sqrt{\frac{L_n + L_i}{(C_c + C_d)(L_n L_i)}}$$

Where $C_c$ is the compliance associated with the ink volume in the chamber $C_d$ is the compliance of the movable wall.

$L_n$ is the inertance of the liquid in the nozzle $L_i$ is the inertance of the liquid in the inlet restrictor.

further explicit expressions of $C_c$, $L_n$ and $L_i$ are:

$$C_c = \frac{V}{\rho c^2}$$

Where V is the volume of the chamber, $\rho$ is the density of the ink, and c is the velocity of sound in the ink.

$$L_n = \frac{4\rho\, l_n}{3\,\pi r^2}$$

Where $l_n$ is the length of the nozzle r is the radius of the nozzle $$L_i = \frac{k\rho l_i}{nA},$$

where k is a shape factor determined by the cross-section shape of the restrictor channels.

A is the cross-sectional area of a single restrictor channel.

n is the number of restrictor channels, and $l_i$ is the length of a single restrictor channel.

In general, it has been found desirable to have a characteristic Helmholtz resonant frequency which is substantially higher than the rate of ink droplet ejection. Preferably, the Helmholtz resonant frequency is at least twice the rate of ink droplet ejection. In numerical terms, it is desirable to have a Helmholtz frequency of at least 10 KHz and less than 100 KHz with 25 KHz to 50 KHz preferred so as to permit high droplet ejection rates on a demand basis.

Figure 1A:
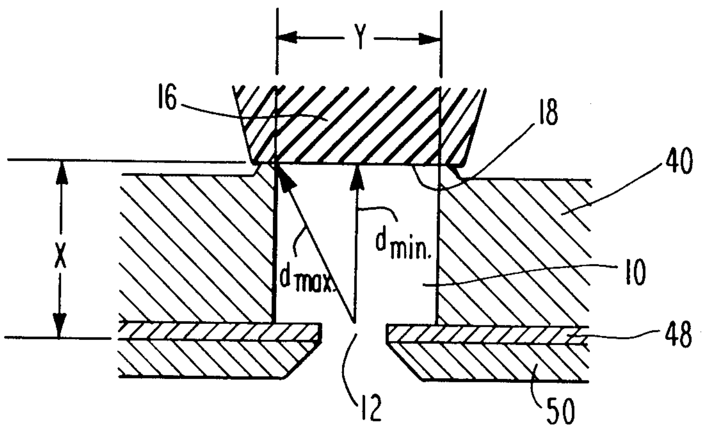
FIG. 1*a* is an enlarged sectional view of the chamber shown in FIG. 1.

From the foregoing, it will be appreciated that it is generally desirable to achieve a small chamber to achieve a high Helmholtz resonant frequency so as to permit a high droplet ejection rate on a demand basis. However, the ejection droplet rate and jet stability regardless of Helmholtz resonant frequency can be adversely affected by undesirably small or low acoustic resonant frequencies of the chamber or undesirably small or low transducer resonant frequencies along the axis of coupling e.g., longitudinal or length mode resonant frequencies of the transducers 14 and 204. Accordingly, it is desirable to assure that the overall length of the chamber does not greatly exceed the maximum cross-sectional dimension of the chamber, e.g., diameter in the case of a cylindrical chamber. As used herein, the term overall length of the chamber defines the length parallel with the axis of droplet ejection from the rear of the chamber remote from the orifice to the exterior of the orifice itself. As shown in FIG. 1*a*, this dimension is represented by the distance X whereas the maximum cross-sectional dimension is represented by the dimension Y.

In general, it is considered desirable to achieve an aspect ratio, i.e., a ratio of length to the cross-sectional dimension of no more than 5 to 1 with no more than 2 to 1 preferred. It will also be understood that the length X may be less than the cross-section dimension Y. By utilizing this aspect ratio, the acoustic resonant frequency of the chamber (i.e., organ pipe resonance) will remain sufficiently high such that the acoustic resonant frequency of the chamber does not unduly limit the operating frequency of stable operation of the jet.

It will also be appreciated that there is a certain minimum cross-sectional dimension Y which can be achieved without requiring an increase in the overall length of the transducer which would in turn decrease the axial or length mode resonant frequency of the transducer thereby limiting the operating frequency of the demand jet. A minimum cross-sectional sectional dimension Y of 0.6 mm is desirable so as to maximize the axial or length mode resonant frequency. In this regard, it will be appreciated that the overall length of the transducer would necessarily increase in order to achieve the necessary displacement as the maximum cross-sectional dimension Y of the chamber is reduced.

As noted previously, it is desirable to couple the transducer into the chamber as a point source. In this regard, it is preferred that the difference in pressure pulse transit times from each point on the transducer coupling wall be less than 1 microsecond and preferably less than 0.1 microsecond and 0.05 microsecond represents an optimum. Assuming a given ink composition and therefore a predetermined acoustic velocity through the ink within a chamber, the difference in acoustic path length or distance $d_{max}$ less $d_{min}$ as shown in FIG. 1*a* may be determined for a given high frequency acoustic disturbance. In this regard, it will be appreciated that it may be desirable to operate ink jets with high frequency components present of at least 100 KHz and preferably 1 MHz. Assuming an acoustic velocity of $1.5\times10^5$ cm/sec equal to the acoustic velocity in water and a high frequency component of 100 KHz, the difference in acoustic path length or distance $d_{max}$ minus $d_{min}$ should not exceed 1.5 mm (60 mils) and is preferably less than 0.15 mm (6 mils). Assuming a 1 MHz frequency component, the difference in path lengths should not exceed 0.15 mm (6 mils). The same difference in path lengths also applies to the embodiment of FIGS. 7 through 9.

The following examples of chambers of various dimensions are provided to illustarate various aspects of the invention:

| | |
|---|---|
| Example 1: | X = 2.54 mm (100 mils)<br>Y = 1.78 mm (70 mils)<br>acoustic velocity $1.5 \times 10^5$ cm/sec<br>high frequency component of 1 MHz |
| Example 2: | X = 2.54 mm (100 mils)<br>Y = 1.60 mm (63 mils)<br>acoustic velocity $1.2 \times 10^5$ cm/sec<br>(oil base ink) high frequency component of 1 MHz. |
| Example 3: | X = 1.27 mm (50 mils)<br>Y = 1.27 mm (50 mils)<br>acoustic velocity $1.5 \times 10^5$ cm/sec<br>high frequency component of 1 MHz. |

From the foregoing, it will be appreciated that the cross-sectional dimension of the chamber 10 and 200 must be sufficiently large to achieve a sufficiently high Helmholtz frequency vis-a-vis the operating frequency of the jet and yet sufficiently small vis-a-vis the acoustic resonant frequency and the longitudinal or length mode resonant frequency of the transducers 14 and 204. In this connection, it has been found that the cross-sectional dimension of the chamber transverse to the axis of droplet ejection should be at least 10 times greater than the cross-sectional dimension of the orifice transverse to the axis of droplet ejection. Dimensionally, considering a cross-sectional dimension of the orifice in the range of 0.025 mm to 0.075 mm, it is preferred that the cross-sectional dimension of the chamber exceed 0.6 mm and preferably lies in the range of 0.6 mm to 1.3 mm.

In accordance with another important aspect of the invention, the length X as shown in FIG. 1*a* is short so as not to undesirably reduce the Helmholtz frequency into the operating frequency range. At the same time, the relatively short chamber creates a relatively high acoustic resonant frequency. As shown, the overall axial length of the transducer is such that the acoustic resonant frequency is more than the longitudinal or length mode resonant frequency of the transducer.

In general, it is preferred that the resonant frequency along the axis of coupling of the transducer, e.g., the longitudinal resonant frequencies of the transducers be at least 25% greater than the Helmholtz frequency. Preferably, the resonant frequency along the axis of coupling is at least 50% greater than the Helmholtz frequency.

By utilizing the cylindrical transducers 14, the number of resonant modes of the transducers are desirably reduced. However, it will be appreciated that other transducers may be utilized which expand along the direction of elongation but are not of cylindrical cross-section, e.g., rectangular cross-section transducers having an overall length to minimum width ratio not exceeding 30 to 1 and a thickness transverse to the length in the range of 0.4 to 0.6 mm as shown in FIGS. 7 to 9.

As noted previously, the inlet openings 214 and 20 maintain the cross-sectional area of ink flowing into the chambers substantially constant during expansion and contraction of the transducer along the axis of elongation. To the extent that the diaphragm 210 does move into the area representing the inlet 214 as shown in FIG. 8, the cross-sectional dimension of ink as represented by the height h of the inlet 214 must be substantially greater than the total change in length of the transducer as the transducer expands and contracts. In this connection, it will be appreciated that the overall height h is in the range of 0.025 mm to 0.075 mm with less than 0.05 mm being preferred whereas the overall change in length at the transducer 204 is 0.05 to 0.50 microns with less than 0.24 microns preferred. For this purpose, it is also impotant that the inlet restrictor and orifice inertance in parallel lie in the range of $10^7$ to $10^9$ Pa sec.$^2$/m$^3$.

It will also be appreciated that the overall size of the inlet restrictor must bear a certain relationship with the ink jet orifice. In this connection, it is desirable that the minimum cross-sectional dimension of the restrictor be maintained so as to be less than or equal to the nozzle diameter or cross-sectional dimension. This will assure a Helmholtz frequency greater than the operating frequency but less than the length mode or acoustic resonant frequency.

In the foregoing, it has been emphasized that this invention provides an ink jet with a Helmholtz (fluidic) resonant frequency that is less than the transducer length mode resonant frequency and preferably one-half of that frequency. At the same time, the Helmholtz frequency is substantially higher than the required drop repetition rates, i.e., more than 10 KHz and preferably more than 25 KHz. Since the Helmholtz frequency tends to be fairly well damped, ringing of the system at the frequency does not adversely affect the stability of drop formation process. Also, with the Helmholtz frequency substantially less than the length mode frequency, the fluid system is unable to respond to the length mode ringing of the transducer which tends to be poorly damped. This poorly damped length mode ringing can have an adverse affect on device performance when the fluid system is able to respond at the length mode frequency. This situation requires external damping of the transducer array, often with the effect of increasing the drive voltage which is not the case with the invention as described herein.

As shown in the embodiments of FIGS. 1 through 4 as well as FIGS. 7 through 9, an electric field is applied transverse to the axis of elongation of the transducer. As shown in FIGS. 1 and 4, this is accomplished by electrodes 30 and 26 whereas in FIGS. 7 through 9, this is accomplished by printed circuit elements 238 which are electrically connected to electrodes 260. These electrodes provide a means for applying an electric field to the transducer such that the transducer contracts along the axis thereby expands the chamber and the transducer expands along the axis so as to contracts chamber in the absence of an electric field applied to the transducer. This is particularly important in order to avoid accelerated aging of the transducers 14 and 204 and, in the extreme case, depolarization. In other words, if an electric field is applied transverse to the transducer so as to expand the transducer, such an electric field tends to depolarize the transducer rendering it inoperative at least over a period of time. It is therefore important that the electric field which is applied transverse to the transducer be applied in such a manner so as to contract the transducer.

Figure 10:
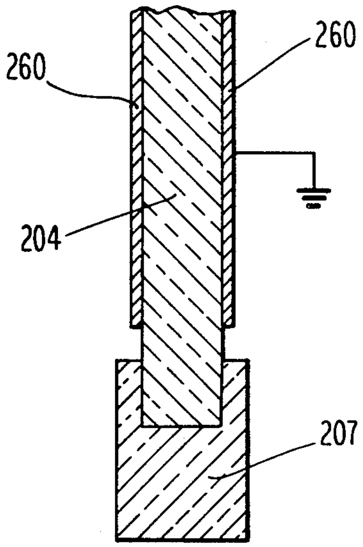
FIG. 10 is a schematic diagram of the transducer shown in FIG. 7 in the deenergized state.
Figure 11:
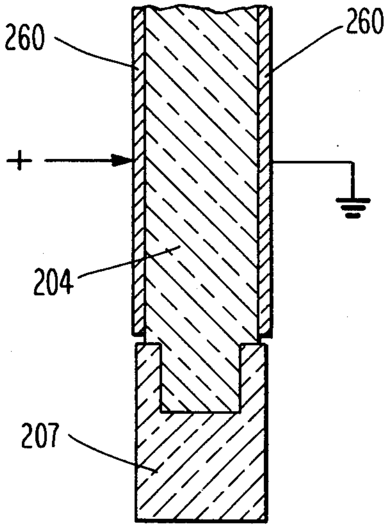
FIG. 11 is a schematic diagram of the transducer of FIG. 10 in the energized state.

In order to provide a further understanding for the manner in which the electric field is applied to the transducers, reference is now made to FIGS. 10 and 11. As shown in FIG. 10, the transducer 204 carries electrodes or electrical connections 260 where the transducer 204 extends outwardly beyond the tip of the electrodes 260. With one of the electrodes 260 grounded and the other electrode unenergized, the transducer 204 takes on the configuration shown in FIG. 10. On the other hand, when one of the electrodes 260 is energized with a positive voltage as depicted in FIG. 11 and the other electrode 260 is grounded, the transducer 204 actually expands across the thickness of the transducer 204 but contracts along the length of the transducer 204. In this connection, it is important to appreciate that the electric field produced by the voltage applied as shown in FIG. 11 is in the same direction as the polarization of the transducer 204. It will, of course, be understood that the expansion and contraction illustrated in FIGS. 10 and 11 represents an exaggeration.

In accordance with another important aspect of the invention, it will be appreciated that the only communication between the transducers 14 and 204 is through the coupling means into the chamber, e.g., the foot or diaphragm. Thus transducers in the arrays as shown in FIGS. 5, 6 and 9 are substantially isolated from the ink and are in exclusive communication with a single chamber or jet. Moreover, a seal is provided between the chamber and the transducers, e.g., the diaphragm 210 shown in FIG. 9 to prevent ink from flowing up into and around the transducer, e.g., the transducers 204.

As utilized herein, the term elongated is intended to indicate that the length is greater than the width. In other words, the axis of elongation as utilized herein extends along the length which is greater than the transverse dimension across which the electric field is applied. Moreover, it will be appreciated that the particular transducer may be elongated in another direction which might be referred to as the depth and the overall depth may be greater than the length. It will therefore, be understood that the term elongation is a relative term. Moreover, it will be understood that the transducer will expand and contract in other directions in addition to along the axis of elongation but such expansion and contraction is not of concern because it is not in the direction of coupling. In the embodiments shown herein, the axis of coupling is the axis of elongation. Accordingly, it will be understood that the length mode resonance is in the direction of coupling and, in the embodiments shown, does represent the resonant frequency along the axis of- elongation. However, the expansion and contraction will be sufficient along the axis of elongation so as to maximize the displacement of ink.

Although particular embodiments of the invention have been shown and described, other embodiments will occur to those of ordinary skill in the art which fall within the true spirit and scop of the appended claims.

I claim:

1. An ink jet apparatus comprising:
- a variable volume chamber having an ink droplet ejecting orifice;
- a transducer adapted to expand and contract along an axis of elongation in response to an electric field substantially transverse to the axis of elongation, said transducer having a length mode resonant frequency;
- coupling means between the chamber and the transducer for expanding and contracting the chamber in response to expansion and contraction along the axis of the transducer;
- restricted inlet means in said chamber for maintaining the cross-sectional area of ink flowing into said chamber substantially constant during expansion and contraction along the axis of elongation; and
- said chamber having a Helmholtz frequency less than the length mode resonant frequency of the transducer.

2. The apparatus of claim 1 wherein said axis of said transducer extends in a direction having at least a component parallel with the axis of the droplet ejection orifice.

3. The apparatus of claim 2 wherein said restricted inlet means is located immediately adjacent said coupling means and the expanding and contracting of said chamber does not substantially affect the cross-sectional area.

4. The apparatus of claim 1 wherein said coupling means substantially isolates said transducer from said chamber and said inlet means.

5. The apparatus of claim 4 wherein said coupling means comprises a substantially rigid foot attached to said transducer and forming the wall of said chamber.

6. The apparatus of claim 4 said coupling means comprises a diaphragm.

7. The apparatus of claim 1 wherein movement of said coupling means in response to the expanding and contracting of the transducer is confined to an area located inwardly from said inlet means toward the axis of ejection.

8. The apparatus of claim 7 wherein said axis of said transducer extends in a direction having at least a component parallel with the axis of the droplet ejection orifice.

9. The apparatus of claim 8 wherein said transducer is rectangular in cross-section transverse to said axis of elongation.

10. The apparatus of claim 8 wherein said transducer is circular in cross-section transverse to said axis of elongation.

11. An ink jet apparatus comprising:
- a variable volume chamber having an ink droplet ejecting orifice;
- a transducer adapted to expand and contract along an axis of elongation in response to an electric field substantially transverse to the axis of elongation;
- coupling means between the chamber and the transducer for expanding and contracting the chamber in response to expansion and contraction along the axis of said transducer; and
- restricted ink inlet means in said chamber for maintaning the inertance of the inlet means from $10^7$ to $10^9$ Pa/M$^3$/ sec./sec.

12. The apparatus of claim 11 wherein the size of the restricted inlet means remains substantially constant as said transducer expands and contracts.

13. The apparatus of claim 11 wherein said axis of said transducer expands in a direction having at least a component parallel with the axis of the droplet ejection orifice.

14. The apparatus of claim 11 wherein said restricted inlet means is located immediately adjacent said coupling means.

15. The apparatus of claim 14 wherein said axis of said transducer extends in a direction having at least a component parallel with the axis of the droplet ejection orifice.

16. The apparatus of claim 15 wherein said coupling means substantially isolates said transducer from said chamber and said inlet means.

17. The apparatus of claim 16 wherein said coupling means comprises a substantially rigid foot attached to said transducer and forming a wall of said chamber.

18. The apparatus of claim 16 wherein said coupling means comprises a diaphragm.

19. An ink jet apparatus comprising:
- a variable volume chamber having an ink droplet ejecting orifice;
- a transducer adapted to expand and contract along an axis of elongation in response to an electric field substantially transverse to the axis of elongation, said transducer having a length mode resonant frequency;
- coupling means between the chamber and the transducer for expanding and contracting the chamber in response to expansion and contraction along the axis of said transducer; and
- restricted ink inlet means in said chamber having dimensions such that the parallel inertance of the orifice and the restrictive inlet means maintains a Helmholtz resonant frequency greater than the operating frequency of the jet and less than the length mode resonant frequency of the transducer.

20. The apparatus of claim 19 wherein the size of the restricted inlet means remains substantially constant as the transducer expands and contracts.

21. The apparatus of claim 19 wherein the axis of said transducers expands in a direction having at least a component parallel with the axis of the droplet ejection orifice.

22. The apparatus of claim 19 wherein said restricted inlet means is located immediately adjacent said coupling means.

23. The apparatus of claim 22 wherein said axis of said transducer extends in a direction having at least a component parallel with the axis of the droplet ejection orifice.

24. The apparatus of claim 23 wherein said coupling means substantialy isolates said transducer from said chamber and said inlet means.

25. The apparatus of claim 24 wherein said coupling means comprises a substantially rigid foot attached to said transducer and forming a wall of said chamber.

26. The apparatus of claim 24 wherein said coupling means comprises a diaphragm.

27. An ink jet apparatus comprising:

a variable volume chamber having an ink droplet ejecting orifice;

a transducer adapted to expand and contract along an axis of elongation in response to an electric field substantially transverse to the axis of elongation;

coupling means between the chamber and the transducer for expanding and contracting the chamber in response to expansion and contraction along the axis of said transducer;

restricted inlet means in said chamber for ink flowing into said chamber; and means for applying an electric field to said transducer such that said transducer contracts along said axis so as to expand said chamber and fill said chamber through said inlet means and said transducer expands along said axis so as to contract said chamber in the absence of an electric field applied to said transducer so as to eject a droplet.

28. The apparatus of claim 27 wherein said transducer comprises a piezoelectric material.

29. The apparatus of claim 27 wherein the total change in length is substantially less than the minimum cross-sectional dimension of ink flowing into said chamber through said inlet means.

30. The apparatus of claim 29 wherein said minimum cross-sectional dimension is equal to or less than the minimum cross-sectional dimension of said orifice transverse to the axis of droplet ejection.

31. The apparatus of claim 30 wherein said axis of said transducer extends in a direction having at least a component parallel with the axis of the droplet ejection orifice.

32. The apparatus of claim 31 wherein said transducer contracts substantially away from said orifice in the presence of said field.

33. The apparatus of claim 27 wherein said transducer is cylindrical in cross-section transverse to said axis of elongation.

34. The apparatus of claim 27 wherein said transducer is rectangular in cross-section transverse to said axis of elongation.

35. An ink jet apparatus comprising:

a variable volume chamber having an ink droplet ejecting orifice;

a transducer adapted to expand and contract along an axis of elongation in response to an electric field substantially transverse to the axis of elongation;

coupling means between the chamber and the transducer for expanding and contracting the chamber in response to expansion and contraction along the axis of said transducer;

restricted inlet means in said chamber for ink flowing into said chamber; and said transducer having a longitudinal resonant frequency along said axis greater than a Helmholtz frequency of said chamber.

36. The apparatus of claim 35 wherein said Helmholtz frequency is greater than 10 KHz.

37. The apparatus of claim 35 wherein said Helmholtz frequency is greater than 25 KHz.

38. The apparatus of claim 35 wherein said longitudinal resonant frequency is at least 25% greater than the Helmholtz frequency.

39. The apparatus of claim 35 wherein said longitudinal resonant frequency is at least 50% greater than the Helmholtz frequency.

40. The apparatus of claim 35 wherein the cross-sectional dimension of the chamber transverse to the axis of droplet ejection is at least 10 times greater than the cross-sectional dimension of said orifice transverse to the axis of droplet ejection.

41. The apparatus of claim 40 wherein said cross-sectional dimension of said chamber exceeds 0.6 mm.

42. The apparatus of claim 35 wherein said cross-sectional dimension of said chamber lies in the range of 0.6 mm to 1.3 mm and said cross-sectional dimension of said orifice lies in the range of 0.025 mm to 0.075 mm.

43. The apparatus of claim 35 wherein said transducer is cylindrical in cross-section transverse to said axis.

44. The apparatus of claim 35 wherein said transducer is rectangular in cross-section transverse to said axis.

45. The apparatus of claim 35 wherein the overall acoustic path length difference from each point on said coupling means to said orifice is less than 1.5 mm.

46. The apparatus of claim 45 wherein said overall path length difference is less than 0.15 mm.

47. An ink jet apparatus comprising: a variable volume chamber having an ink droplet ejecting orifice;

a transducer adapted to expand and contract along an axis of elongation in response to an electric field substantially transverse to the axis of elongation;

coupling means between the chamber and the transducer for expanding and contracting the chamber in response to expansion and contraction along the axis of said transducer;

restricted inlet means in said chamber for ink flowing into said chambers; and said chamber having a cross-sectional dimension transverse to the axis of said orifice at least 10 times larger than the cross-sectional dimension of said orifice transverse to the axis of droplet ejection and having a Helmholtz resonant frequency greater than 10 KHz.

48. The ink jet apparatus of claim 47 wherein said Helmholtz resonant frequency is greater than 25 KHz.

49. The ink jet apparatus of claim 48 wherein said Helmholtz resonant frequency is less than 100 KHz.

50. The apparatus of claim 47 wherein said cross-sectional dimension of said chamber exceeds 0.6 mm.

51. The apparatus of claim 47 wherein said cross-sectional dimension of said chamber lies in the range of 0.6 to 1.2 mm and said cross-sectional dimension of said orifice lies in the range of 0.025 to 0.075 mm.

52. The apparatus of claim 49 wherein said transducer is cylindrical in cross-section transverse to said axis.

53. The apparatus of claim 49 wherein said transducer is rectangular in cross-section transverse to said axis.

54. The apparatus of claim 49 wherein the overall acoustic path length difference at each point on said coupling means to said orifice is less than 1.5 mm.

55. The apparatus of claim 54 wherein the overall path length difference is less than 0.15 mm.

56. The ink jet apparatus of claim 49 wherein the overall length of the chamber as measured along the axis of ejection is no more than 5 times the maximum cross-sectional dimension of the chamber.

57. The apparatus of claim 49 wherein the overall length of the chamber as measured along the axis of ejection is no more than twice the maximum cross-sectional dimension of the chamber transverse to the axis of ejection.

58. An ink jet apparatus comprising:
- a variable volume chamber having a restricted Helmholtz frequency in excess of 10 KHz and less than 100 KHz, an ink droplet ejecting orifice and a movable wall spaced from said orifice; and
- a transducer communicating with said wall so as to change the volume of said chamber as a function of transducer energization, said wall having a sufficiently small area such that the difference in the pressure pulse transit times from each point on said wall is less than 1 microsecond.

59. The ink jet apparatus of claim 58 wherein said Helmholtz frequency is more than 25 KHz and less than 50 KHz.

60. The ink jet apparatus of claim 58 wherein the difference in transit times is less than 0.1 microseconds.

61. The ink jet apparatus of claim 58 wherein the difference in transit times is less than 0.05 microseconds.

62. An ink jet apparatus comprising:
- a variable volume chamber having a restricted inlet port of substantially constant cross-section, an ink droplet ejecting orifice, a movable wall spaced from said orifice and characterized by a Helmholtz frequency in excess of 10 KHz and less than 100 KHz;
- a transducer communicating with said wall and expanding and contracting in a direction having at least a component parallel with the axis of said ejecting orifice;
- said wall having a sufficiently small area such that the difference in ink pressure pulse transit time from each point on said wall is less than 1 microsecond.

63. The ink jet apparatus of claim 58 wherein said Helmholtz frequency is more than 25 KHz and less than 50 KHz.

64. The ink jet apparatus of claim 63 wherein said difference in ink pressure pulse transit times is less than 0.1 microsecond.

65. The ink jet apparatus of claim 63 wherein said difference in ink pressure pulse transit times is less than 0.05 microsecond.

66. An ink jet apparatus comprising:
- a variable volume chamber having an ink droplet ejecting orifice;
- a transducer adapted to be energized;
- coupling means between the chamber and transducer for coupling displacement of the transducer into the chamber along an axis of coupling; and
- restricted inlet means in said chamber for maintaining the cross-sectional area of ink flowing into said chamber substantially constant and of a size so as to maintain a Helmholtz resonant frequency in excess of 10 KHz and less than a resonant frequency of the transducer along the axis of coupling.

67. An ink jet apparatus comprising:
- a variable volume chamber having an ink droplet ejecting orifice;
- a transducer;
- coupling means adapted to couple displacement of the transducer into the chamber;
- inlet means in said chamber for flowing ink into said chamber; and
- said transducer having a resonant frequency along the axis of coupling into the chamber greater than a Helmholtz frequency of the chamber, said Helmholtz frequency being greater than 10 KHz.

68. A drop on demand ink jet apparatus comprising:
- a variable volume chamber having an ink droplet ejecting orifice;
- a transducer coupled to the chamber; and
- means for controlling the energization of the transducer so as to maintain the volume of ink in a contracted state when the transducer is deenergized without ejecting droplets of ink, to expand the volume of ink during filling of the chamber when the transducer is energized, and to return the volume of ink to the contracted state while ejecting a droplet of ink when the transducer is again deenergized.

69. An ink jet apparatus comprising:
- a variable volume chamber having a Helmholtz frequency in excess of 10 KHz and less than 100 KHz, an ink droplet ejecting orifice and a movable wall spaced from said orifice; and
- a transducer communicating with said wall so as to change the volume of said chamber as a funtion of transducer energization.

* * * * *